United States Patent
Fitzpatrick

(10) Patent No.: US 10,628,437 B1
(45) Date of Patent: Apr. 21, 2020

(54) SYSTEMS AND METHODS FOR TRACEABILITY AND IMPACT ANALYSIS ACROSS DATA ISLANDS

(71) Applicant: UIPCO, LLC, San Antonio, TX (US)

(72) Inventor: Kenneth Mark Fitzpatrick, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 240 days.

(21) Appl. No.: 15/459,885

(22) Filed: Mar. 15, 2017

Related U.S. Application Data

(60) Provisional application No. 62/314,007, filed on Mar. 28, 2016.

(51) Int. Cl.
*G06F 16/25* (2019.01)
*G06F 16/93* (2019.01)

(52) U.S. Cl.
CPC .......... *G06F 16/252* (2019.01); *G06F 16/256* (2019.01); *G06F 16/258* (2019.01); *G06F 16/93* (2019.01)

(58) Field of Classification Search
CPC ......... G06F 17/30221; G06F 17/30569; G06F 17/30563; G06F 17/30917; G06F 16/51; G06F 16/162; G06F 16/168; G06F 16/13; G06F 16/252; G06F 16/258; G06F 16/256; G06F 16/93; G06Q 10/10
See application file for complete search history.

(56) References Cited

U.S. PATENT DOCUMENTS

| | | | | |
|---|---|---|---|---|
| 7,904,480 B2* | 3/2011 | Palanisamy | ............. | H04L 67/16 |
| | | | | 707/798 |
| 7,962,464 B1* | 6/2011 | Brette | .................... | G06F 16/951 |
| | | | | 707/706 |
| 2002/0188522 A1* | 12/2002 | McCall | .............. | G06Q 30/0613 |
| | | | | 705/26.41 |

(Continued)

OTHER PUBLICATIONS

Anderson, K, et al., "Towards Large-Scale Information Integration", May 19-25, 2002, ICSE, ACM 1-58113-472-X/02/0005, pp. 524, 534. <NPL Large Scale Information Integration.pdf.> (Year: 2002).*

*Primary Examiner* — James Trujillo
*Assistant Examiner* — Michal Bogacki
(74) *Attorney, Agent, or Firm* — Fletcher Yoder, P.C.

(57) ABSTRACT

The present disclosure relates generally to systems and methods of managing normally independent or unassociated business artifacts using an integrated business artifact management system (IBAMS) to deliver a cohesive, linked, and traceable network of related and integrated artifacts that supports improved business knowledge and impact analysis. A disclosed IBAMS includes a collection of integrated business artifacts stored in a memory of the IBAMS and a plurality of links, each associated with a respective data island of a plurality of data islands. Each link includes a set of instructions that, when executed by a processor of the IBAMS, cause the processor to: receive business artifacts from the respective data island; generate representations that are abstractions of the business artifacts received from the respective data island; and store and integrate the representations in the collection of integrated business artifacts.

20 Claims, 2 Drawing Sheets

(56) References Cited

U.S. PATENT DOCUMENTS

Figure 1:
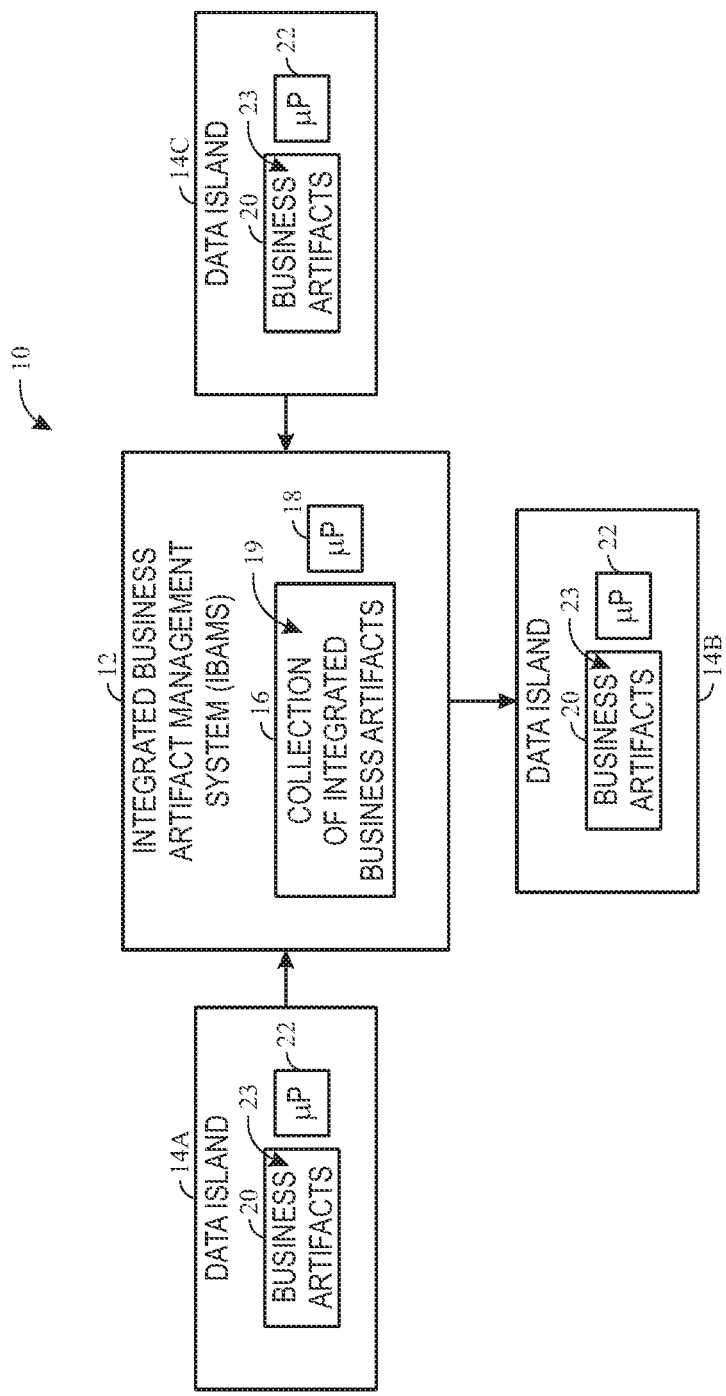

| | | | |
|---|---|---|---|
| 2005/0216555 A1* | 9/2005 | English | G06Q 50/18 709/204 |
| 2005/0256892 A1* | 11/2005 | Harken | G06Q 10/10 |
| 2005/0262192 A1* | 11/2005 | Mamou | G06F 17/30563 709/203 |
| 2007/0143744 A1* | 6/2007 | Clemm | G06F 8/71 717/128 |
| 2007/0265900 A1* | 11/2007 | Moore | G06Q 10/06 705/7.12 |
| 2008/0040387 A1* | 2/2008 | Schwartz | G06F 16/9535 |
| 2009/0282066 A1* | 11/2009 | Russell | G06F 8/71 |
| 2011/0126131 A1* | 5/2011 | Baszucki | G06F 3/011 715/757 |
| 2012/0084306 A1* | 4/2012 | Merritt | G06F 16/86 707/756 |
| 2012/0198416 A1* | 8/2012 | Sirr | G06F 8/35 717/104 |
| 2013/0318070 A1* | 11/2013 | Wu | G06F 16/284 707/722 |
| 2015/0248226 A1* | 9/2015 | Kumar | G06F 3/04847 715/747 |
| 2015/0363453 A1* | 12/2015 | Carbajales | G06F 17/30356 707/695 |
| 2016/0012535 A1* | 1/2016 | Phinney, Jr. | G06Q 40/06 705/36 R |
| 2016/0092526 A1* | 3/2016 | Kothari | G06F 17/30563 707/602 |
| 2016/0306790 A1* | 10/2016 | Mos | G06Q 10/067 |
| 2017/0147594 A1* | 5/2017 | Huang | G06F 17/30 |
| 2017/0169076 A1* | 6/2017 | Shridhar | G06F 16/288 |
| 2017/0177183 A1* | 6/2017 | Ritter | G06F 16/27 |

* cited by examiner

SYSTEMS AND METHODS FOR TRACEABILITY AND IMPACT ANALYSIS ACROSS DATA ISLANDS

CROSS REFERENCE TO RELATED APPLICATION

This application claims priority to and the benefit of U.S. Provisional Application No. 62/314,007, entitled "SYSTEMS AND METHODS FOR BUSINESS ARTIFACT MANAGEMENT ACROSS DATA ISLANDS," filed Mar. 28, 2016, which is hereby incorporated by reference in its entirety for all purposes.

BACKGROUND

The present disclosure relates generally to systems and methods of managing normally independent or unassociated business artifacts using an integrated business artifact management system (IBAMS) to deliver a cohesive, linked, and traceable network of related and integrated artifacts that supports improved business knowledge and impact analysis.

Businesses generally produce a litany of different business artifacts that represent a considerable wealth of business information. These business artifacts may include, for example, regulatory documents, sales documents, product documentation, customer records, spreadsheets, inventory, business rules, computer programs, user interfaces, and so forth. Traditionally, business artifacts have been stored across a wide array of vertical best-of-breed business tools and document repositories that are largely independent and mutually incompatible, resulting in business data being disconnected and scattered across a number of isolated data islands.

Data islands are generally non-integrated collections of business artifacts that are separately stored across a network. There is no facile way to move business artifacts between these isolated data islands, nor is there a ready way of linking these business artifacts in a manner that provides a holistic perspective of the entire inventory of business artifacts in a cohesive and relational manner. As such, achieving traceability and performing impact analysis across multiple data islands of disparate business artifacts is difficult and inefficient. For example, it can be difficult to holistically determine the impact that a potential change in policy or procedure may have on a business, which can lead to considerable inefficiencies. When preparing for a new project, for example, despite the volumes of business artifacts available to the project members, the generally vertical, independent, incompatible, and unlinked nature of these artifacts results in an inability to succinctly prepare and assemble the disparate artifacts in a proactive and cohesive manner. Further, this usually results in a complete and independent recreation of equivalent business artifacts and knowledge, representing considerable rework and inefficiency.

Integrated business artifact management systems (IBAMS) provide solutions for centrally managing disparate business artifacts. Such systems generally enable traceability and enable impact analysis with respect to a centralized collection of business artifacts. For example, an IBAMS can rapidly identify all business artifacts from a collection that relate to or include a particular feature or condition. However, IBAMS can restrict how users create business artifacts for integration into the collection. For example, IBAMS often require that business artifacts be created using particular software tools, such as those that are integrated into (e.g., native to) the IBAMS. These integrated software tools may be significantly different from the software tools to which a user is accustomed and, further, may suffer from limited functionality compared to more familiar software tools. As such, a user may be forced to learn a new software interface and may be limited by the functionality of the required software tool when producing business artifacts for integration in the collection. Therefore, while IBAMS enable traceability and impact analysis, IBAMS can also significantly reduce user freedom to use software tools of choice when producing business artifacts. Compared to users' Best-of-Breed tools, IBAMS typically feature a disappointing volume of compromised features, specializations, and usability. Furthermore, reengineering existing artifacts within the IBAMS may be unfeasible, may add unnecessary risk, and/or may be perceived as being unacceptably threatening to existing tools and processes. Historically, these factors have resulted in users resisting efforts to migrate to an IBAMS in favor of retaining their familiar tools, resulting in no improvements to overall usefulness and cohesiveness of the business artifacts.

BRIEF DESCRIPTION

In an embodiment, an integrated business artifacts management system (IBAMS) includes a collection of integrated business artifacts stored in a memory of the IBAMS, as well as a plurality of links, each associated with a respective data island of a plurality of data islands. Each link includes a set of instructions that, when executed by a processor of the IBAMS, cause the processor to: receive business artifacts from the respective data island; generate representations that are abstractions of the business artifacts received from the respective data island; and store and integrate the representations in the collection of integrated business artifacts.

In another embodiment, a computer-implemented method is executable by an integrated business artifacts management system (IBAMS) having a processor and a memory storing a collection of integrated business artifacts. The method includes receiving, via the processor, a business artifact from a data island communicatively coupled to the processor of the IBAMS, wherein the business artifact is in a native data format of the data island that is incompatible for integration into the collection of integrated business artifacts. The method includes generating, via the processor, one or more representations of the business artifact, wherein the one or more representations are abstractions of the business artifact having a format suitable for integration into the collection of integrated business artifacts. The method further includes storing and integrating, via the processor, the one or more representations of the business artifact in the collection of integrated business artifacts in the memory of the IBAMS.

In another embodiment, an integrated business artifacts management system (IBAMS) includes a processor and a memory storing a collection of integrated business artifacts. The IBAMS includes a plurality of data islands communicatively coupled to the processor of the IBAMS, each storing business artifacts in a respective native data format that is incompatible for integration into the collection of integrated business artifacts. The IBAMS includes a plurality of links stored in the memory, each associated with a respective one of a plurality of data islands. Each link includes a set of instructions that, when executed by the processor of the IBAMS, cause the processor to: receive business artifacts from the respective data island; generate representations of the business artifacts received from respective data island, wherein the representations are abstractions that include a substantial portion of the information contained in the received business artifacts; and store and integrate the representations in the collection of integrated business artifacts.

DRAWINGS

Figure 2:
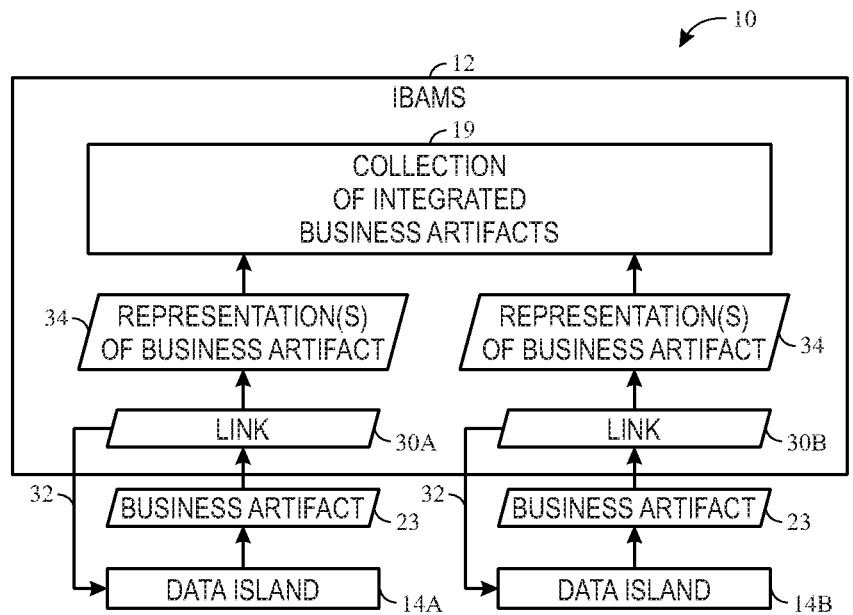
Figure 3:
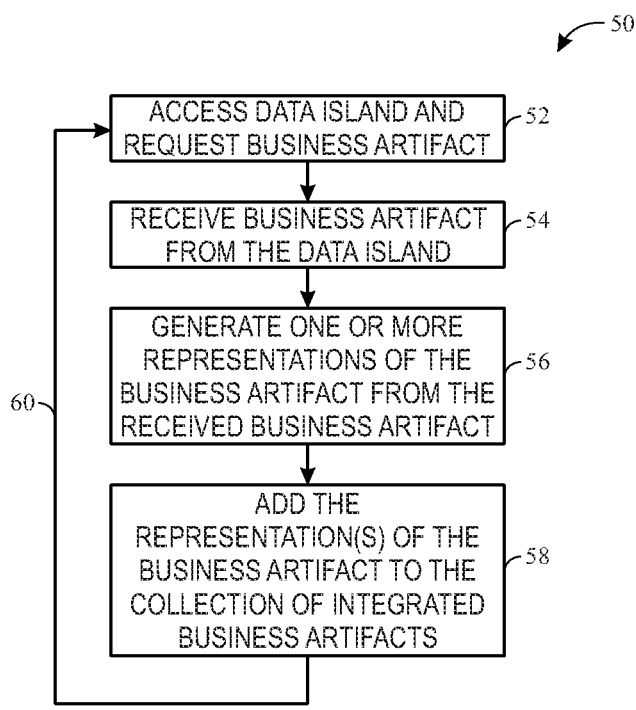

These and other features, aspects, and advantages of the present disclosure will become better understood when the following detailed description is read with reference to the accompanying drawings in which like characters represent like parts throughout the drawings, wherein:

FIG. 1 is a schematic representation of an integrated business artifact management system (IBAMS) that generally retrieves business artifacts from a number of data islands and adds representations of these business artifacts to a collection of integrated business artifacts, in accordance with embodiments of the present approach;

FIG. 2 is a diagram of an IBAMS generating representations of business artifacts stored on data islands, and then storing the representations in the collection of integrated business artifacts, in accordance with embodiments of the present approach; and FIG. 3 is a flow diagram of an example process of the present approach, whereby the IBAMS solution calls for the generation of representations of business artifacts stored on the various data islands, and then stores the representations in the collection of integrated business artifacts, in accordance with embodiments of the present approach.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are directed toward systems and methods for incorporating (e.g., consolidating, integrating) business artifacts from various data islands into an integrated business artifact management system (IBAMS). As discussed in greater detail below, present embodiments include systems and methods for linking an IBAMS to various data islands of a network such that representations (e.g., copies, images, facsimiles, metadata) of business artifacts stored on the data islands can be imported into the collection of business artifacts managed by the IBAMS. As such, present embodiments include an IBAMS capable of integrating into the collection of business artifacts representations of the business artifacts originally produced outside of the IBAMS by their respective native tools in their native data formats, and stored within their respective native data islands. Accordingly, present embodiments enable at least a portion of the information contained within these business artifacts to be used (e.g., considered, processed, applied) by the IBAMS during operation (e.g., for impact analysis or traceability). Further, by providing the IBAMS with access to information contained within the business artifacts stored on a variety of different systems and in a variety of different formats, present embodiments maximize the user's freedom to use software tools of choice in developing business artifacts, while still providing the advantages of the IBAMS, in terms of traceability and impact analysis. As such, by utilizing representations of business artifacts within the common artifact integration and linking environment provided by the IBAMS, present embodiments enable non-threatening IBAMS implementations that do not restrict the users' choice of software tools for generating business artifacts and do not require the wholesale reengineering of existing business artifacts from their native tools, repositories, and formats.

With the foregoing in mind, FIG. 1 is a schematic of a portion of computer network 10 that includes an IBAMS 12, in accordance with embodiments of the present approach. Further, the network 10 also includes non-integrated data islands 14A, 14B, and 14C, typically with independent or incompatible formats, tools, and repositories, which are communicatively coupled to the IBAMS 12 through a suitable communication medium (e.g., a wired or wireless data network). The illustrated IBAMS 12 includes a memory 16 and a processor 18 that cooperate to store and execute instructions (e.g., software, applications, modules) to provide the functionality described below, including the management of a collection 19 of integrated business artifacts. Similarly, each of the data islands 14A-C includes a respective memory 20 and processor 22 that cooperate to generate and store business artifacts 23 outside of the IBAMS 12. In other embodiments, the IBAMS 12 and/or the data islands 14A-C may include any suitable number or type of memories or processors, in accordance with the present disclosure.

As mentioned above, the illustrated data islands 14A-C represent data repositories, databases, servers that host particular software tools, or any other computerized system within the network 10 that generates and/or stores business artifacts 23 outside of the IBAMS 12. For example, in certain embodiments, the data islands 14A-C may include one or more of: a database system; a document repository system; a Rule-Xpress™ system or other suitable business rule system; an IBM® InfoSphere® Business Glossary system or other suitable vocabulary and classification system; an Enterprise Resource Planning (ERP) system; a process inventory system; an HP® Application Lifecycle Management (ALM) system, IBM® Rational Team Concert™ (RTC) or another suitable software lifecycle management system; an enterprise portfolio management (EPM) system, a technology portfolio management (TPM) system, or other enterprise planning and portfolio management system; an iGrafx® system or another suitable business process management system; a Salesforce® system or another suitable customer relationship management system; a BWise® system or another suitable risk management system. Accordingly, the data islands 14A-C may generally include any computerized system communicatively coupled to the network 10 that stores business artifacts 23 outside of the IBAMS 12.

In certain embodiments, the IBAMS 12 may be an IBM® Rational Dynamic Object Oriented Requirements System (DOORS) Next Generation™ (RDNG) system, or another suitable integrated business artifact management system. In general, the IBAMS 12 manages the collection 19 of integrated business artifacts stored in the memory 16. Business artifacts in the collection 19 may include, for example, regulatory documents, sales documents, customer data, spreadsheets, communications, memorandums, inventory data, sales data, policy data, portfolio data, process diagrams, strategic roadmaps, glossaries, business rules, business objectives, business capabilities, business requirements, data models, strategic roadmaps, software code, user interfaces, or any other suitable electronic document generated by a business. These business artifacts are generally integrated (e.g., associated, interrelated) with one another by the IBAMS 12 based on corresponding features and data. For example, the IBAMS 12 can be queried to determine every business artifact within the collection 19 that relates to a particular customer program or to a particular sales account. As such, the collection 19 of integrated business artifacts enables the IBAMS 12 to be used, for example, to provide holistic views of the impact (e.g., cost, effect, implications) of changes across the business. By specific example, if a business wanted to assess the impact of switching from using a five-digit zip code to a Zip+4 code (which includes an additional four digits), the IBAMS 12 could be used to identify every business artifact from the collection 19 of integrated business artifacts (e.g., documents, application code, business rules, database fields, user interfaces, policies, etc.) that would need to be modified in order to implement the change to Zip+4 throughout the business. Moreover, the IBAMS 12 is capable of performing this analysis in a complete, cohesive, and automated manner, which is enabled by the business artifact linking and integration environment provided by the IBAMS 12.

In the absence of the present disclosure, if the IBAMS 12 were used to analyze the impact of a business change in the system illustrated in FIG. 1, like the example change to Zip+4 discussed above, then the IBAMS 12 would not be able to consider business artifacts 23 stored in the memories 20 of the data islands 14A-C. Accordingly, in the absence of the present disclosure, in order for the IBAMS 12 to consider information from business artifacts 23 during operation, the business artifacts 23 would generally be reengineered or recreated using native software tools of the IBAMS 12, and the original software tools, repositories, and data formats of the data islands 14A-C would be subsequently abandoned. As discussed below, the presently disclosed IBAMS 12 enables impact analysis and traceability without requiring the reengineering of business artifacts 23 using native tools of the IBAMS 12 or requiring users to abandon the software tools, repositories, and data formats of the data islands 14A-C.

As generally illustrated in FIG. 1 and discussed in greater detail below, the presently disclosed IBAMS 12 is able to communicatively couple with these data islands 14A-C via the network 10 in order to extract information regarding business artifacts 23 stored in the memory 20 of each data island 14A-C. Further, as discussed below, the presently disclosed IBAMS 12 adds representations (e.g., exact copies, or abstractions such as facsimiles, images, or metadata) of the business artifacts 23 stored in the memory 20 of the data islands 14A-C to the collection 19 of integrated business artifacts stored in the memory 16 of the IBAMS 12. In general, the IBAMS 12 is unaware that business artifacts added to the collection 19 in this manner were not created using native tools for generating business artifacts within the IBAMS 12, or that certain business artifacts may be abstractions (e.g., images, facsimiles, or metadata representations) of original business artifacts 23 actually located on data islands 14A-C. As such, the disclosed IBAMS 12 is capable of performing analyses that takes into account information from the business artifacts 23 generated and stored by other systems of the network 10. Therefore, the disclosed IBAMS 12 does not restrict a user's freedom to use software tools of choice in developing business artifacts 23. In other words, present embodiments impose no requirements that artifacts, favored or best-of-breed tools, or repositories be migrated to another solution. Rather, present embodiments enable the user to freely generate business artifacts 23 on the data islands 14A-C using the software tools of choice, while still enabling information from the business artifacts 23 to be utilized by the IBAMS 12 for traceability and impact analysis.

FIG. 2 is a diagram illustrating an embodiment of an IBAMS 12 generating representations of business artifacts stored on independent and non-integrated data islands 14A and 14B, and then storing the representations in a collection 19 of integrated business artifacts, in accordance with embodiments of the present approach. In addition to the collection 19 of integrated business artifacts discussed above, the IBAMS 12 illustrated in FIG. 2 includes links 30A and 30B. Links 30A and 30B are generally sets of instructions executable by the processor 18 to enable the IBAMS 12 to access the data island 14 and extract the representation of the business artifact 23.

In one embodiment, the IBAMS 12 includes a distinct link for each data island (e.g., link 30A and 30B for data islands 14A and 14B, respectively) from which the IBAMS 12 retrieves business artifacts 23. In certain embodiments, as illustrated, the links 30A and 30B may be software components (e.g., scripts, modules, functions, programs) that are part of the IBAMS 12. In other embodiments, each link 30A and 30B may be stand-alone sets of instructions (e.g., applications, scripts, modules, functions, programs) executed separately by the IBAMS 12. In still other embodiments, each link 30 may instead be executed by the processor 22 of the data island 14 to provide information regarding stored business artifacts 23 for eventual integration into the collection 19.

As illustrated in FIG. 2, the links 30A and 30B generally operate to retrieve information regarding the business artifacts stored by data islands 14A and 14B. As illustrated, in certain embodiments, the links 30A and 30B may communicate with data islands 14A and 14B, as indicated by the arrows 32, requesting one or more business artifacts stored on the data islands 14A and 14B. In other embodiments, the data islands 14A and 14B may send business artifacts 23 to the links 30A and 30B, respectively, without being prompted to do so (e.g., based on a recurring schedule or as business artifacts are generated). The links 30A and 30B receive the business artifacts 23 from the data islands 14A and 14B and generate one or more representations 34 for each business artifact 23 received from data islands 14A and 14B. For embodiments in which the links 30A and 30B may be at least partially executed by the processor 22 of a data island 14, the processors 22 of the data islands 14A and 14B generate the representations 34 of the business artifacts, which may subsequently be provided to the IBAMS 12 for eventual integration into the collection 19.

FIG. 3 is a flow diagram that illustrates an example process 50 that the processor 18 of the IBAMS 12 may perform when executing a link (e.g., link 30A of FIG. 2) to retrieve information regarding a business artifact 23 stored on a data island (e.g., data island 14A of FIG. 2), in accordance with embodiments of the present approach. First, as illustrated in FIG. 3, the processor 18 executing the link 30A accesses or queries (block 52) the data island 14A and requests a copy of a business artifact 23 stored in the memory 20 of a data island 14A. In response, the processor 18 receives (block 54) a copy of the business artifact 23 from the data island.

Since the received business artifact 23 was generated by the data island 14 separately from the IBAMS 12, the received business artifact 23 may be in a different format from those already stored in the collection 19 of integrated business artifacts. As such, in certain embodiments, the processor 18 may generate (block 56) one or more representations of the received business artifact. In certain embodiments, in which the link 30A is executed by the data island 14A, the processor 22 of the data island 14A may instead generate the representation of the business artifact and deliver the representation to the IBAMS 12.

In certain embodiments, the generated representations 34 may be images, snap-shots, models, facsimiles, metadata, or other suitable abstractions of information contained within the received business artifact 23. By specific example, if the business artifact 23 were a process flow generated by iGrafx® or another suitable business process management system, then the processor 18 may generate one or more representations 34 (e.g., bitmap images) of a process flow diagram of the original business artifact 23. Since the generated representations 34 are usually an abstraction of the original business artifact 23, these representations generally do not include all of the information contained in the original business artifact 23. Rather, the representations 34 may include at least a portion (e.g., a substantial portion, bearing certain important defining elements) of the information of the original business artifact 23 and are generally in a format that is compatible for integration into the collection 19 managed by the IBAMS 12. Additionally, it may be appreciated that the link 30A may implement or utilize a particular application programming interface (API) of the particular software tool of the data islands 14A to generate one or more representations of a business artifact 23. By specific example, certain software tools may include an API for generating images (e.g., bitmap images) of a business artifact 23 that might contain mixtures of vector graphics data and textual data, and this API may be utilized by the link 30A to generate one or more representations (e.g., bitmap images) of the original business artifact 23. In certain embodiments, when the original business artifact 23 is in a particularly suitable format, the representation 34 may instead be the entire original business artifact 23. In some cases, it can make sense to abandon the native tools, file formats, and data islands of certain business artifact types and completely reengineer the associated business artifacts within the context of the IBAMS.

Continuing through the process 50, the processor 18 of the IBAMS 12 stores (block 58) and integrates the representation of the business artifact 23 in the collection 19 of integrated business artifacts disposed in the memory 16 of the IBAMS 12. As such, the IBAMS 12 may use the representation of the business artifact 23 stored in the collection 19 of integrated business artifacts for the purposes of traceability and impact analysis. Therefore, the disclosed IBAMS 12 is capable of gleaning and using information from business artifacts 23 generated and stored by data islands 14A-C outside of the IBAMS 12. As indicated by the arrow 60, in certain embodiments, the processor 18 of the IBAMS 12 may repeat the process 50 intermittently, on a recurring scheduled basis, or in response to a signal from a data island 14A indicating that a new or updated business artifact is available in the memory 20 of the data island 14A.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. An integrated business artifacts management system (IBAMS), comprising:
   a data island comprising an independent data repository and a processor, wherein the processor is configured to store business artifacts in the independent data repository in a native format of a native tool associated with the data island;
   a collection of integrated business artifacts stored in a memory of the IBAMS; and
   a link associated with the data island and comprising a set of instructions that, when executed by an IBAMS processor of the IBAMS, cause the IBAMS processor to:
      receive the business artifacts from the data island;
      generate representations that are abstractions of the business artifacts received from the data island, wherein the representations are generated in a format that is different than the native format associated with the native tool;
      store and integrate the representations in the collection of integrated business artifacts;
      update the collection of integrated business artifacts in response to receiving an indication from the processor of the data island that a new business artifact is available at the data island; and
   perform an impact analysis that includes the representations of business artifacts stored and integrated in the collection of integrated business artifacts, wherein the impact analysis utilizes the representations of business artifacts stored and integrated in the collection of integrated business artifacts to determine a holistic view of an impact of a change across an organization associated with the IBAMS.

2. The IBAMS of claim 1, comprising a plurality of data islands that includes the data island, wherein each respective data island of the plurality of data islands comprises a respective independent data repository storing respective business artifacts, which are created using respective native tools of an independent processor of each respective data island and stored in a respective native format associated with each respective data island.

3. The IBAMS of claim 2, wherein the respective native format of at least one data island of the plurality of data islands is incompatible with the respective native format of a remaining portion of the plurality of data islands.

4. The IBAMS of claim 1, wherein the data island comprises a database system, document repository system, vocabulary and classification system, Enterprise Resource Planning (ERP) system, process inventory system, software lifecycle management system, enterprise planning and portfolio management system, business process management system, customer relationship management system, or risk management system, or a combination thereof.

5. The IBAMS of claim 1, wherein the business artifacts include regulatory documents, sales documents, customer data, spreadsheets, communications, memorandums, inventory data, sales data, policy data, portfolio data, process diagrams, strategic roadmaps, glossaries, business rules, business objectives, business capabilities, business requirements, data models, strategic roadmaps, software code, or user interfaces, or combinations thereof.

6. The IBAMS of claim 1, wherein the representations comprise images, snap-shots, models, facsimiles, or meta-data, or combinations thereof, generated as the abstractions of the business artifacts received from the data island.

7. A computer-implemented method executable by an integrated business artifacts management system (IBAMS) having an IBAMS processor and a memory storing a collection of integrated business artifacts, the method comprising:
receiving, via the IBAMS processor, business artifacts from a first independent data repository of a first data island and a second independent data repository of a second data island, wherein respective business artifacts of each respective data island are generated by respective native tools of each data island in a respective native format of each data island, and wherein each data island is communicatively coupled to the IBAMS processor;
generating, via the IBAMS processor, representations of the business artifacts that are abstractions of the business artifacts received from each data island, wherein the representations of the business artifacts from the first data island are generated in the respective native format associated with the first data island, and wherein the representations of the business artifacts from the second data island are generated in a format different than the respective native format associated with the second data island;
storing and integrating, via the IBAMS processor, the representations of the business artifacts in the collection of integrated business artifacts in the memory of the IBAMS; and
performing, via the IBAMS processor, an impact analysis of the collection of integrated business artifacts, wherein the impact analysis includes analysis of the representations of business artifacts stored and integrated in the collection of integrated business artifacts to determine a holistic view of an impact of a change across an organization associated with the IBAMS.

8. The method of claim 7, wherein generating the representations comprises generating, via the IBAMS processor, images, snap-shots, models, facsimiles, or metadata, or combinations thereof, from the business artifacts received from each data island, wherein the representations include a substantial portion of the information contained in the business artifacts.

9. The method of claim 7, wherein each data island is a database system, document repository system, vocabulary and classification system, Enterprise Resource Planning (ERP) system, process inventory system, software lifecycle management system, enterprise planning and portfolio management system, business process management system, customer relationship management system, or risk management system.

10. The method of claim 7, wherein the business artifacts comprise: regulatory documents, sales documents, customer data, spreadsheets, communications, memorandums, inventory data, sales data, policy data, portfolio data, process diagrams, strategic roadmaps, glossaries, business rules, business objectives, business capabilities, business requirements, data models, strategic roadmaps, software code, or user interfaces, or combinations thereof.

11. The method of claim 7, wherein receiving the business artifacts from each data island comprises querying, via the IBAMS processor, a respective processor of each data island to send the business artifacts from a respective independent data repository.

12. The method of claim 7, wherein receiving the business artifacts from the respective independent data repository of a respective data island is automatically performed in response to at least one of the business artifacts being generated by the respective processor of the respective data island.

13. An integrated business artifacts management system (IBAMS), comprising:
an IBAMS processor;
a memory storing a collection of integrated business artifacts;
a plurality of data islands communicatively coupled to the IBAMS processor, each comprising a respective processor executing a respective native tool that generates and stores business artifacts in a respective native format; and
a plurality of links stored in the memory, each associated with a respective data island of the plurality of data islands, wherein each link comprises a set of instructions that, when executed by the IBAMS processor, cause the IBAMS processor to:
receive one or more of the business artifacts from the respective data island;
generate representations of the business artifacts received from the respective data island, wherein the representations are abstractions that include a substantial portion of the information contained in the received business artifacts, wherein the representations associated with at least one respective data island of the plurality of data islands are generated in the respective native format associated with the at least one respective data island, and wherein the representations associated with at least one other respective data island of the plurality of data islands are generated in a format different than the respective native format associated with the at least one other respective data island;
store and integrate the representations in the collection of integrated business artifacts; and
perform an impact analysis that includes the representations of business artifacts stored and integrated in the collection of integrated business artifacts, wherein the impact analysis utilizes the representations to determine a holistic view of an impact of a change across an organization associated with the IBAMS.

14. The IBAMS of claim 13, wherein each data island of the plurality of data islands comprises a different system type of a plurality of system types, and wherein the plurality of system types comprises a database system, document repository system, vocabulary and classification system, Enterprise Resource Planning (ERP) system, process inventory system, software lifecycle management system, enterprise planning and portfolio management system, business process management system, customer relationship management system, or risk management system, or a combination thereof.

15. The IBAMS of claim 13, wherein the abstractions comprise images, snap-shots, models, facsimiles, or metadata, or combinations thereof, of the received business artifacts.

16. The IBAMS of claim 13, wherein the IBAMS enables the respective native tool of each respective data island of the plurality of data islands to implement the change in the respective native format.

17. The IBAMS of claim 13, wherein the set of instructions include instructions that, when executed by the IBAMS processor, cause the IBAMS processor to update the collection of integrated business artifacts in response to receiving an indication from the respective processor of a particular data island of the plurality of data islands that a new business artifact is available at the particular data island.

18. The IBAMS of claim 1, wherein the data island is configured to generate the business artifacts in the native format using an application programming interface (API) of the native tool.

19. The IBAMS of claim 1, wherein the change across the organization associated with the IBAMS comprises a modification of a number of digits stored in a parameter field within at least one of the business artifacts.

20. The IBAMS of claim 1, wherein the set of instructions include instructions that, when executed by the IBAMS processor, cause the IBAMS processor to generate additional representations of other business artifacts of the data island, and wherein the additional representations are generated in the native format as exact copies of the other business artifacts.

* * * * *